INVENTOR.
Theodore A. St. Clair
BY
Johnson and Kline
ATTORNEYS

Jan. 28, 1964 — T. A. ST. CLAIR — 3,119,264
TEMPERATURE COMPENSATING MEANS FOR GAS METERS
Filed Aug. 4, 1961 — 2 Sheets-Sheet 2

INVENTOR.
Theodore A. St. Clair
BY
Johnson and Kline
ATTORNEYS

United States Patent Office 3,119,264
Patented Jan. 28, 1964

3,119,264
TEMPERATURE COMPENSATING MEANS
FOR GAS METERS
Theodore A. St. Clair, Fairfield, Conn., assignor to
Textron, Inc., Providence, R.I., a corporation of
Rhode Island
Filed Aug. 4, 1961, Ser. No. 129,450
9 Claims. (Cl. 73—281)

The present invention relates to a temperature compensated tangent unit for use in gas meters.

Heretofore, efforts have been made to provide temperature compensating means for gas meters but these have not been satisfactory, either because they were not sufficiently rugged and reliable in operation under loads to provide the required adjustment or they have not been sufficiently accurate in their operation in changing the operating radius of the tangent unit so as to provide temperature compensation for the meter without altering the timing thereof.

The present invention overcomes these difficulties by providing a temperature compensated tangent unit which is rugged in construction and reliable in operation without altering the timing of the meter. This is accomplished by providing heat-responsive means, preferably in the form of opposed bimetal thermostatic elements which are circular and extend for substantially 270°. These are mounted on the adjusting bracket of the meter in such a manner as to cause the tangent post to move in a straight line during the adjusting operation and to move along a line intersecting the center of rotation of the circle traveled by the tangent post in the operation of the meter.

In one form of the invention herein illustrated, the opposed bimetal elements are physically located on opposite sides of the tangent post with their mounting portions connected to the tangent posts in a manner that the mounting portions extend in the same direction and in parallel planes.

In another form of the invention the opposed bimetal elements are nested and have the mounting portions for the ends thereof connected to the tangent post so as to lie in substantially parallel planes, but with the mounting portions extending in opposite directions.

Other features and advantages of the invention will be apparent from the specification and claims when considered in connection with the accompanying drawings in which:

Figure 1:
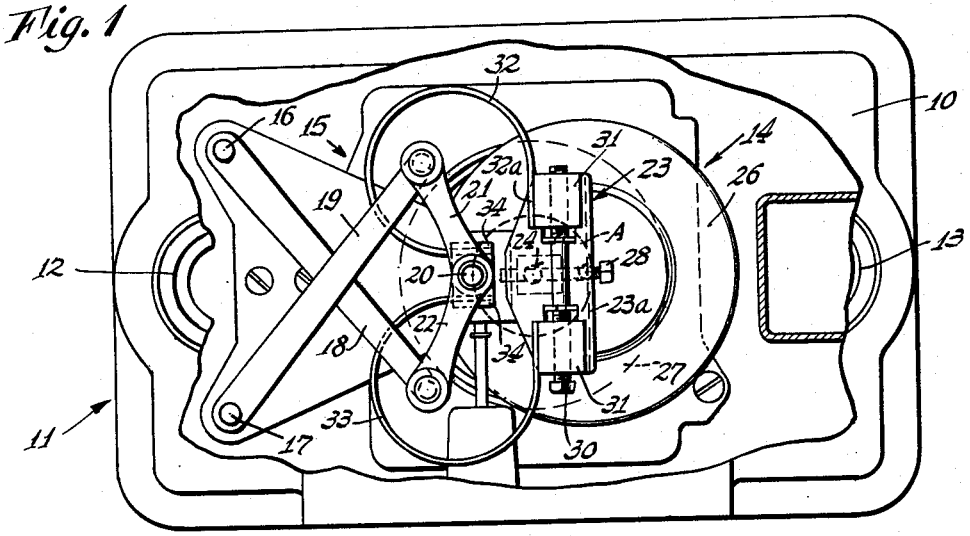
FIGURE 1 shows a plan view, partly cut away, of a top of a meter.
Figure 2:
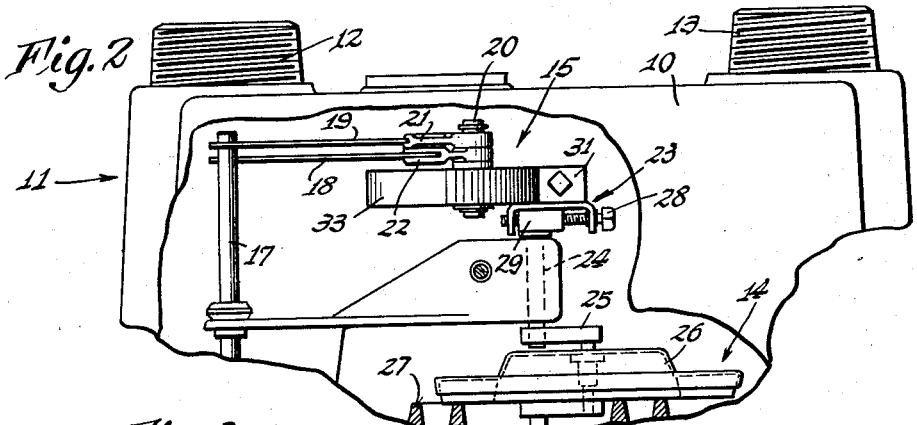
FIG. 2 is a side view, partly cut away, of the top of the meter.
Figure 3:
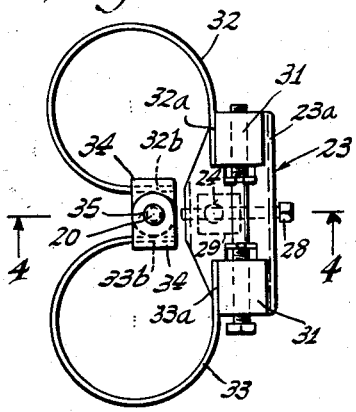
FIG. 3 is a plan view of the tangent unit.
Figure 4:
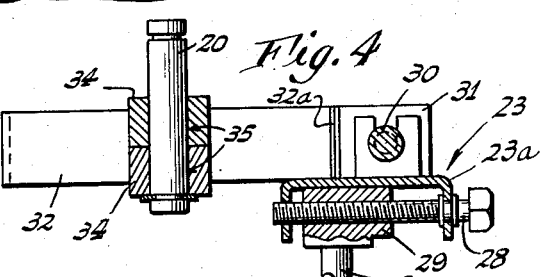
FIG. 4 is a view taken along lines 4—4 of FIG. 3.

As shown in FIGS. 1 and 2, the top section 10 of the meter 11 is illustrated having the inlet and outlet connections 12, 13 cut away to show the valve 14 and the tangent unit 15 in position therein. Referring to FIGS. 1 and 2, the flag shafts 16, 17 project into the top chamber and have rigidly connected thereto flag arms 18, 19 which are reciprocated in response to rotation of the flag shaft by the diaphragms, not shown. The arms are moved with respect to each other such that a circular motion, as indicated by dash line A, is imparted to a tangent post 20 through links 21, 22 connected to the ends of the tangent arms and pivoted to the tangent post. The tangent post 20 is mounted on a bracket 23 secured to the main shaft 24 by means of a novel temperature-responsive assembly as will be described. The main shaft, through a link 25, rotates the valve 26 over the valve seat 27 and also operates the counting mechanism (not shown) as is usual in meters of this type. The bracket has a portion 23a provided with a screw 28 rotatably mounted thereon, as shown in FIG. 4, cooperating with a block 29 secured to the main shaft 24 for adjusting the diaphragm stroke and has a transversely extending adjusting screw 30 connected to the mounting blocks 31 for adjusting the timing of the diaphragms.

Inasmuch as the heating value of a given gas is proportional to its density and since the density is proportional to the absolute temperature, compensation for changes in heat value delivered may be brought to a constant and proper value by adjustment of the diaphragms so that the diaphragm strokes and volumetric displacement may be changed. This is accomplished according to the present invention by providing thermal responsive elements in the form of bimetal members 32, 33 which, in the illustrated form of the invention, are circular and extend for a distance of approximately 270°. The ends of each member are provided with mounting portions 32a, 32b and 33a, 33b by which the bimetal is connected to the bracket and to the tangent post. In the form of the invention shown in FIG. 1, the two bimetals, which are substantially identical, are physically opposed and have their ends 32a, 33a connected to the blocks 31 on the bracket and the other ends 32b, 33b connected to mounting lugs 34 which have apertures 35 pivotally connected to the tangent post in such a manner that as the temperature causes the bimetal loop to expand or contract, the two opposed loops will cause the tangent pin to move in a straight line which will intersect the center of the circle, shown in dash lines in FIG. 1, through which the tangent pin moves. The bimetals, as shown, are substantial and heavy strips and provide a rugged and dependable operator for moving the tangent posts, even under substantial loads. Since, as shown in FIG. 2, the two ends 32b, 33b connected to the tangent post lie in parallel planes and extend in the same direction, the action of the two circular bimetals, in expanding and contracting in response to changes in temperature, will be uniform and will each aid to apply the required force for changing the position of the post with respect to the main shaft. The lugs pivoted to the post will permit the slight variations of the location of the mounting portions with respect to the post without binding as the bimetal circles expand or contract and produce an angular displacement on the mounted portion.

Figure 5:
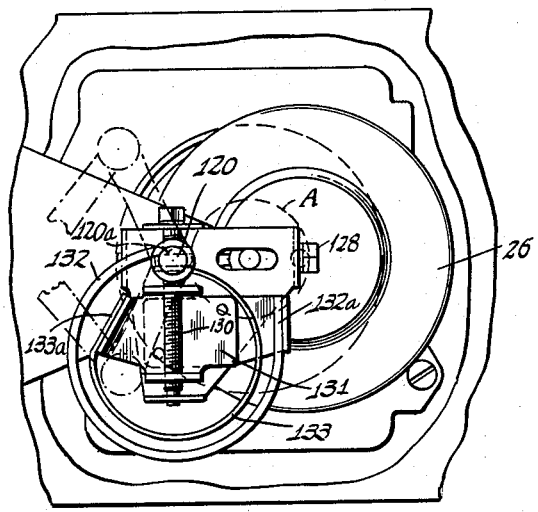
FIG. 5 is a fragmentary view similar to FIG. 1 showing another form of the invention.
Figure 6:
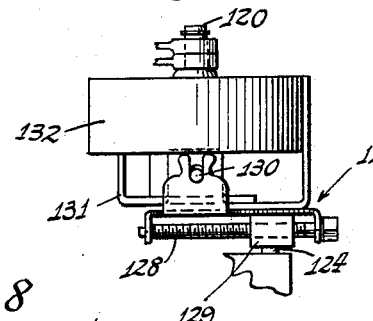
FIG. 6 is a side view of the device of FIG. 5.
Figure 7:
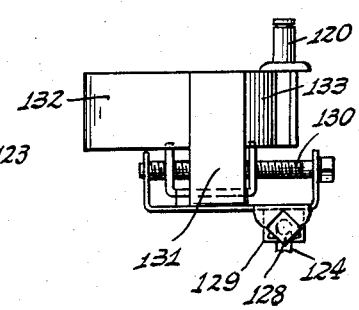
FIG. 7 is an end view of the device of FIG. 5.
Figure 8:
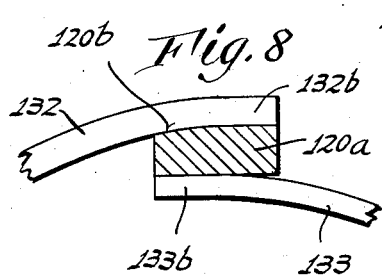
FIG. 8 is an enlarged detailed section of the connection of the mounting portions of the bimetals to the post shown in FIG. 5.

In the form of the invention shown in FIGS. 5–8, a bracket 123 is secured to the main shaft 124 and is connected to the tangent post 120 by a thermal responsive means. In this form of the invention the bracket is adjustable with respect to the main shaft by means of a screw 128 threaded in a block 129 connected to the main shaft for adjusting the stroke of the diaphrams, and has mounted thereon a movable portion 131 adjustable, by means of a screw 130, in a transverse direction for adjusting the timing of the meter. The thermal responsive means in this form of the invention comprises a pair of bimetal loops 132, 133 mounted in physically opposed nested relation. This nested relation provides for a conservation of space. Each of the elements extends through substantially 270° and is provided with mounting portions or extensions at each end. The mounting portions 132a, 133a are connected to the portion 131 of the bracket as shown in FIG. 5 and the mounting portions 132b, 133b are connected to the tangent post 120. The mounting portions project tangentially to the element at the end thereof and are located on opposite sides of and secured to a flattened portion 120a of the post and extend in opposite directions. Thus, the action in displacing the tangent post is a combination of the push of one element and the pull of the other which moves the post in a straight line passing through the center of the circle of movement A of the post 120 to vary the radial distance between the post and main shaft in accordance with variations in temperature of the gas being measured. The flattened section 120a can have the edge 120b thereof curved, as shown in FIG. 8, to accommodate the curvature of the loop as the loops expand and contract. Furthermore, since the outer loop is a larger loop than the one nested within it, the characteristics and dimensions of the bimetal units as illustrated in FIG. 5 are selected so that they provide uniform forces on either side of the post to cause the post to move in a straight line movement along the radius of the circle of movement A of the tangent post in its operation, thus providing adequate adjustment to compensate for temperature variations without in any way altering the timing of the meter.

Variations and modifications may be made within the scope of the claims and portions of the improvements may be used without others.

I claim:

1. A temperature compensated tangent unit for use in a gas meter having a main shaft and diaphragm operated flag shafts comprising a bracket adapted to be secured to said main shaft for rotation therewith, a tangent post, means operatively connecting the tangent post to the flag shafts, and temperature responsive means connecting the tangent post to the bracket for rotation in a circle about the main shaft comprising opposed circular thermo-responsive elements, each extending through approximately 270° and having one end anchored to the bracket, the other ends of said elements being connected to the tangent post on opposite sides thereof and lying in spaced parallel planes for changing the position of the tangent post and varying the distance between the main shaft and tangent post in response to changes in temperature, said parallel ends causing the tangent post to move in a straight line along a radius of the circle of movement of said post whereby mistiming of the meter is avoided.

2. A temperature compensated tangent unit for use in a gas meter having a main shaft and diaphragm operated flag shafts comprising a bracket adapted to be secured to said main shaft for rotation therewith, a tangent post, link means pivotally connected to the tangent post for connecting the tangent post to the flag shafts, and temperature responsive means connecting the tangent post to the bracket for rotation in a circle about the main shaft comprising a pair of oppositely extending thermo-responsive open loops physically disposed on opposite sides of the tangent post and each extending through approximately 270°, each loop having one end anchored to the bracket and the other end connected to the tangent post and lying in parallel planes for changing the position of the tangent post and varying the distance between the main shaft and tangent post in response to changes in temperature, said parallel ends causing the tangent post to move along a radius of the circle of movement of said post whereby mistiming of the meter is avoided.

3. A temperature compensated tangent unit for use in a gas meter having a main shaft and diaphragm operated flag shafts comprising a bracket adapted to be secured to said main shaft for rotation therewith, a tangent post, link means pivotally connected to the tangent post for connecting the tangent post to the flag shafts, and temperature responsive means connecting the tangent post to the bracket for rotation in a circle about the main shaft comprising a pair of circular bimetal elements extending through approximately 270° and physically opposed and lying on opposite sides of the tangent post, said bimetal elements having one end anchored to the bracket and the other ends extending in the same direction in parallel planes and connected to the tangent post for changing the position of the tangent post and varying the distance between the main shaft and tangent post in response to changes in temperature, said parallel ends causing the tangent post to move along a radius of the circle of movement of said post whereby mistiming of the meter is avoided.

4. A temperature compensated tangent unit for use in a gas meter having a main shaft and diaphragm operated flag shafts comprising a bracket adapted to be secured to said main shaft for rotation therewith, a tangent post, link means pivotally connected to the tangent post for connecting the tangent post to the flag shafts, and temperature responsive means connecting the tangent post to the bracket for rotation in a circle about the main shaft comprising a pair of circular bimetal elements physically opposed and lying on opposite sides of the tangent post, each bimetal element extending through approximately 270° and having one end anchored to the bracket and the other end connected to connector lugs having apertures disposed over the tangent post, said last-named ends lying in parallel planes on opposite sides of said post and changing the position of the tangent post and varying the distance between the main shaft and tangent post in response to changes in temperature, said connector lugs permitting the parallel ends and the tangent post to move in a straight line along a radius of the circle of movement of said post whereby mistiming of the meter is avoided.

5. A temperature compensated tangent unit for use in a gas meter having a main shaft and diaphragm operated flag shafts comprising a bracket adapted to be secured to said main shaft for rotation therewith, a tangent post, link means pivotally connected to the tangent post for connecting the tangent post to the flag shafts, and temperature responsive means connecting the tangent post to the bracket for rotation in a circle about the main shaft comprising a pair of circular bimetal elements physically opposed and lying on opposite sides of the tangent post, each bimetal element extending through approximately 270° and having tangents at their ends forming mounting portions disposed at 90° with each other, the mounting portion at one end being anchored to the bracket and the mounting portions at the other end extending in the same direction and connected to the tangent post, the last-named mounting portions lying in parallel planes and moving the tangent post in a straight line along a radius of the circle of movement of said post and varying the distance between the main shaft and tangent post in response to changes in temperature without causing mistiming of the meter.

6. A temperature compensated tangent unit for use in a gas meter having a main shaft and diaphragm operated flag shafts comprising a bracket adapted to be secured to said main shaft for rotation therewith, a tangent post, link means pivotally connected to the tangent post for connecting the tangent post to the flag shafts, and temperature responsive means connecting the tangent post to the bracket for rotation in a circle about the main shaft comprising a pair of physically opposed circular bimetal elements in nested relation, each bimetal element extending through approximately 270°, said bimetal elements having one end anchored to the bracket and the other ends extending in opposite directions in parallel planes and connected to the tangent post for changing the position of the tangent post and varying the distance between the main shaft and tangent post in response to changes in temperature, one bimetal element applying a pulling force and the other applying a pushing force at said parallel ends causing the tangent post to move in a straight line along a radius of the circle of movement of said post whereby mistiming of the meter is avoided.

7. A temperature compensated tangent unit for use in a gas meter having a main shaft and diaphragm operated flag shafts comprising a bracket adapted to be secured to said main shaft for rotation therewith, a tangent post having a longitudinally flattened portion, link means pivotally connected to the tangent post for connecting the tangent post to the flag shafts, and temperature responsive means connecting the tangent post to the bracket for rotation in a circle about the main shaft comprising a pair of physically opposed circular bimetal elements in nested relation, each bimetal element extending through approximately 270°, said bimetal elements having one end anchored to the bracket and the other ends extending in opposite directions and connected to opposite faces of the flattened portion of the tangent post for changing the position of the tangent post and varying the distance between the main shaft and tangent post in response to changes in temperature, one bimetal element applying a pulling force and the other applying a pushing force at said parallel ends causing the tangent post to move in a straight line along a radius of the circle of movement of said post whereby mistiming of the meter is avoided.

8. A temperature compensated tangent unit for use in a gas meter having a main shaft and diaphragm operated flag shafts comprising a bracket adapted to be secured to said main shaft for rotation therewith, a tangent post operatively connected to the flag shafts, and temperature responsive means connecting the tangent post to the bracket for rotation in a circle about the main shaft comprising a pair of physically opposed circular bimetal elements in nested relation, each bimetal extending through approximately 270° and having one end anchored to the bracket, the other ends of said elements being connected to the tangent post and lying in parallel planes for changing the position of the tangent post and varying the distance between the main shaft and tangent post in response to changes in temperature, said bimetal elements having predetermined characteristics whereby one bimetal element applies a pulling force and the other applies a pushing force at said parallel ends in response to temperature variations causing the tangent post to move in a straight line along a radius of the circle of movement of said post and avoiding mistiming of the meter.

9. A temperature compensated tangent unit for use in a gas meter having a main shaft, a tangent post, diaphragm-operated link means connected to the tangent post to drive the same, and a bracket adapted to be secured to said main shaft for rotation therewith, said unit comprising temperature responsive means connecting the tangent post to the bracket for driving the main shaft in response to rotation of said driven tangent post in a circle about the axis of said shaft, said means comprising opposed circular thermo-responsive elements, each extending through approximately 270° and having one end fixed to the bracket and the other end free to move, said free ends being connected to opposite sides of the tangent post and lying in parallel planes and cooperating to move the tangent post in response to variation in temperature along a radius of the circle of movement of said post passing between said planes and varying the distance between the post and main shaft, whereby temperature compensation is achieved without mistiming of the meter.

References Cited in the file of this patent
UNITED STATES PATENTS

| | | |
|---|---|---|
| 2,339,956 | Sillers | Jan. 25, 1944 |
| 2,753,712 | Douglas | July 10, 1956 |
| 2,912,859 | Douglas | Nov. 17, 1959 |